US010678599B2

(12) United States Patent
Chowdhuri et al.

(10) Patent No.: US 10,678,599 B2
(45) Date of Patent: Jun. 9, 2020

(54) HARDWARE EFFICIENT SYSTEM AND METHOD FOR LOAD BALANCING USING A RANDOM NUMBER (71) Applicant: ROCKLEY PHOTONICS LIMITED, London (GB)

(72) Inventors: Bhaskar Chowdhuri, San Diego, CA (US); Chiang Yeh, Sierra Madre, CA (US); Cyriel Johan Agnes Minkenberg, Neuheim (CH); Guy Regev, Pasadena, CA (US)

(73) Assignee: Rockley Photonics Limited, London (GB)

( * ) Notice: Subject to any disclaimer, the term of this patent is extended or adjusted under 35 U.S.C. 154(b) by 55 days.

(21) Appl. No.: 15/692,875

(22) Filed: Aug. 31, 2017

(65) Prior Publication Data

US 2018/0074861 A1 Mar. 15, 2018

Related U.S. Application Data (60) Provisional application No. 62/394,114, filed on Sep. 13, 2016.

(51) Int. Cl.
*G06F 9/50* (2006.01)
*G06F 7/58* (2006.01)

(52) U.S. Cl.
CPC .............. *G06F 9/505* (2013.01); *G06F 7/58* (2013.01); *G06F 7/588* (2013.01)

(58) Field of Classification Search
None
See application file for complete search history.

(56) References Cited

U.S. PATENT DOCUMENTS

| 2005/0125629 | A1* | 6/2005 | Kissell .................. G06F 8/4442 712/1 |
| 2009/0201811 | A1 | 8/2009 | Filsfils et al. |
| 2010/0023621 | A1 | 1/2010 | Ezolt et al. |
| 2015/0124614 | A1 | 5/2015 | Alizadeh Attar et al. |
| 2017/0265067 | A1* | 9/2017 | Ueda ....................... G06F 13/00 |

OTHER PUBLICATIONS

Alghazawy, Bahaa Aldeen et al., "Probabilistic Packet Scheduling Scheme for Hybrid Pull-Push P2P Live Streaming Protocols", 2011 Second International Conference on Networking and Computing, IEEE Computer Society, 2011, pp. 248-251.
International Search Report and Written Opinion of the International Searching Authority, dated Nov. 14, 2017, Corresponding to PCT/EP2017/072771, 15 pages.

* cited by examiner

*Primary Examiner* — Wynuel S Aquino
*Assistant Examiner* — Melissa A Headly
(74) *Attorney, Agent, or Firm* — Lewis Roca Rothgerber Christie LLP (57) ABSTRACT A system and method for selecting a resource from among a plurality of resources. A total range of numbers is divided into a plurality of sub-ranges, each associated with a respective one of the resources. An indexing number, e.g., a random number, is generated and, when it falls within the total range of numbers, the resource associated with the sub-range into which the indexing number falls is selected. When the indexing number falls outside of the total range, a resource associated with the difference between the indexing number and the greatest number in the total range is selected.

13 Claims, 4 Drawing Sheets

HARDWARE EFFICIENT SYSTEM AND METHOD FOR LOAD BALANCING USING A RANDOM NUMBER

CROSS-REFERENCE TO RELATED APPLICATION(S)

The present application claims priority to and the benefit of U.S. Provisional Application No. 62/394,114, filed Sep. 13, 2016, entitled "EFFICIENT METHOD OF LOAD BALANCING USING A RANDOM NUMBER", the entire content of which is incorporated herein by reference.

FIELD

One or more aspects of embodiments according to the present invention relate to load balancing, and more particularly to a system and method for load balancing using a pseudo-random number.

BACKGROUND

In a system receiving a stream of requests or tasks and assigning each of the tasks to a respective one of a plurality of resources, it may be advantageous to assign the tasks in such a manner that all of the resources carry substantially equal loads. One way to accomplish this is to calculate, for each task, the remainder, when a large, integer, random (or "pseudo-random") number is divided by the number of resources, and to use the remainder as an index to identify the resource to be used. A remainder (or "modulo") operation, however, may be one that is not readily implemented efficiently in digital hardware when the divisor (the number of resources) is not a power of 2. Moreover, it may be advantageous to use a long pseudo-random number (i.e., one represented using a relatively large number of bits) to reduce bias (or "polarization"), but the complexity of the digital logic may grow exponentially with the number of bits used to represent the pseudo-random number.

Thus, there is a need for an improved system and method for load balancing.

SUMMARY

Aspects of embodiments of the present disclosure are directed toward a system and method for selecting a resource from among a plurality of resources. A total range of numbers is divided into a plurality of sub-ranges, each associated with a respective one of the resources. An indexing number, e.g., a random number, is generated and, when it falls within the total range of numbers, the resource associated with the sub-range into which the indexing number falls is selected. When the indexing number falls outside of the total range, a resource associated with the difference between the indexing number and the greatest number in the total range is selected.

According to an embodiment of the present invention there is provided a resource selection circuit for selecting one of a plurality of resources, the circuit including: a first sub-range test circuit having an indexing number input for receiving an indexing number; and a second sub-range test circuit having an indexing number input for receiving the indexing number, the first sub-range test circuit being configured to: determine whether the indexing number is within a first sub-range of numbers; and output a resource number corresponding to the first sub-range of numbers when the indexing number is within the first sub-range of numbers, the second sub-range test circuit being configured to: determine whether the indexing number is within a second sub-range of numbers; and output a resource number corresponding to the second sub-range of numbers when the indexing number is within the second sub-range of numbers, and the first sub-range of numbers and the second sub-range of numbers being contiguous and non-overlapping.

In one embodiment, the first sub-range of numbers has the same size as the second sub-range of numbers.

In one embodiment, the resource selection circuit includes a random number generating circuit having an output connected to: the indexing number input of the first sub-range test circuit; and the indexing number input of the second sub-range test circuit.

In one embodiment, the resource selection circuit includes the bit-wise exclusive OR of the first number and the second number.

In one embodiment, the first sub-range test circuit has: an indexing number output connected to an indexing number input of the second sub-range test circuit; and a selected resource output connected to a selected resource input of the second sub-range test circuit, and the first sub-range test circuit is configured to send: to the indexing number input of the second sub-range test circuit, the indexing number; and to the selected resource input of the second sub-range test circuit: the resource number corresponding to the first sub-range of numbers, when the indexing number is within the first sub-range of numbers; and a reserved value indicating that a resource has not been selected, otherwise.

In one embodiment, the first sub-range test circuit and the second sub-range test circuit are constructed as synchronous logic having a common clock, and the second sub-range test circuit is configured to determine, one clock cycle after the first sub-range test circuit has determined whether the indexing number is within the first sub-range of numbers, whether the indexing number is within the second sub-range of numbers.

In one embodiment, the first sub-range test circuit has an upper limit input, and the first sub-range of numbers extends from zero to a number received at the upper limit input of the first sub-range test circuit.

In one embodiment, the first sub-range test circuit further has a delta input and an upper limit output; the second sub-range test circuit further has an upper limit input connected to the upper limit output of the first sub-range test circuit; and the first sub-range test circuit is configured to form the sum of a number received at the upper limit input of the first sub-range test circuit and a number received at the delta input of the first sub-range test circuit, and transmit the sum through the upper limit output of the first sub-range test circuit.

In one embodiment, the second sub-range test circuit is configured to determine whether the indexing number is within the second sub-range of numbers by: determining that the indexing number is within the second sub-range of numbers if: the selected resource input of the second sub-range test circuit has a value equal to the reserved value; and the indexing number is less than or equal to a number received at the upper limit input of the second sub-range test circuit; and determining that the indexing number is not within the second sub-range of numbers, otherwise.

In one embodiment, the resource selection circuit includes a pre-selection circuit having an indexing number input for receiving the indexing number, the pre-selection circuit being connected to the first sub-range test circuit and being configured to send, to a selected resource input of the first sub-range test circuit: a number identifying a selected resource when the indexing number is not within a total range, the total range being the union of a plurality of sub-ranges of numbers, each of the sub-ranges of numbers being associated with a respective sub-range test circuit of a plurality of sub-range test circuits including the first sub-range test circuit and the second sub-range test circuit; and the reserved value, otherwise.

In one embodiment, the pre-selection circuit is configured to calculate the number identifying the selected resource by subtracting a largest number in the total range from the indexing number.

According to an embodiment of the present invention there is provided a packet switch having an ingress port and a plurality of egress ports, and including a resource selection circuit, the packet switch being configured to employ the resource selection circuit, upon receipt of a packet at the ingress port, to select an egress port from among a plurality of egress ports suitable for routing the packet to a destination identified in the packet.

In one embodiment, the resource selection circuit is configured to receive flow information and generate the indexing number based on the flow information.

According to an embodiment of the present invention there is provided a method for selecting from among a plurality of resources, the method including: associating each of the resources with a respective sub-range of consecutive integers of a plurality of sub-ranges of consecutive integers, the sub-ranges of consecutive integers being non-overlapping and together including all of the integers of a total range of consecutive integers; generating a first indexing number within the total range of consecutive integers; and selecting the resource associated with the sub-range of consecutive integers including the first indexing number.

In one embodiment, the generating of a first indexing number consists of generating a first random number.

In one embodiment, each of the resources is identified by one of a set of consecutive integers beginning with the integer 1; and the method further includes: generating a second random number greater than the largest integer in the total range of consecutive integers, and selecting the resource associated with the integer equal to the difference between second random number and the largest integer in the total range of consecutive integers.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a system and method for load balancing provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Some embodiments are directed to a system and method for balancing a load between a set of resources, e.g., between a viable subset of resources from a given resource pool. For example, a packet switch in a switch fabric may receive a stream of packets, each having destination information such as a destination address (e.g., a destination IP address). Using the destination address and fabric connectivity graph as inputs, a routing algorithm calculates which egress port of the switch each packet should be sent to. Because the final destination of the packet may be reachable via several different egress ports of the packet switch, there may be a plurality of "viable" egress ports (e.g., m egress ports, where m is an integer greater than 1) through which equally efficient paths to the destination exist. The routing algorithm may therefore select one egress port, from among the m viable egress ports, as the egress port through which the packet is to be sent (in this example, the ports are the resources). By making this selection in a pseudo-random manner that results in a substantially equal likelihood of any one of the viable egress ports being selected, the risk of a traffic overload on any of the egress ports may be reduced.

Figure 1:
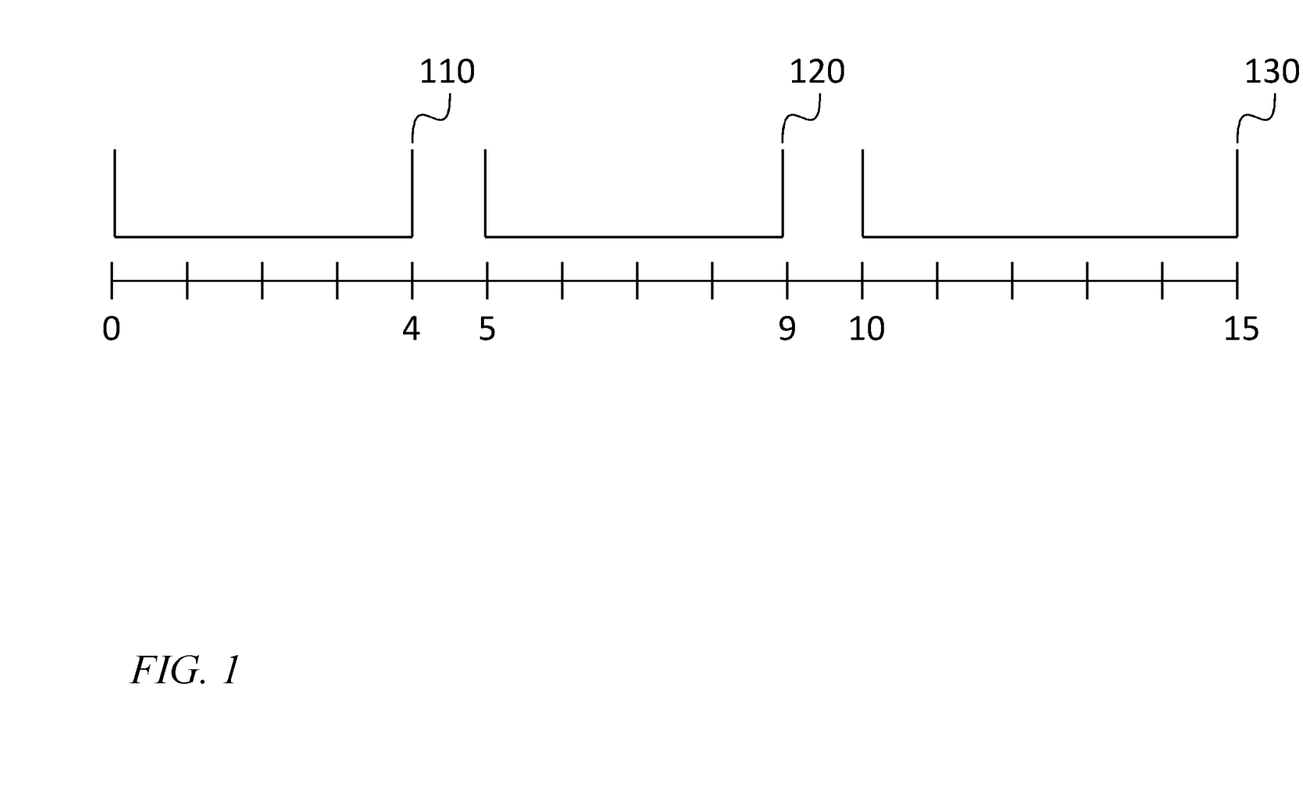
FIG. 1 is a diagram of contiguous sub-ranges, according to an embodiment of the present invention.

In some embodiments, the method operates as follows. A random number generator generates random numbers R in the range between (and including) 0 and $R_{max}$, where $R_{max}$ is the largest random number the random number generator will generate. The terms "random number" and "pseudo-random number" are used interchangeably herein. In some embodiments r bits are used to represent the random number, and the random number generator is capable of generating any such r-bit number, so that $R_{max}=2^r-1$. The range of possible values of R (i.e., the range between (and including) 0 and $R_{max}$) is divided into m contiguous non-overlapping sub-ranges, and each of the sub-ranges is associated with a respective one of the viable egress ports. FIG. 1 shows a set of three sub-ranges for $R_{max}=15$ and m=3, including a first sub-range 110 including the five integers in the range [0, 4], a second sub-range 120 including the five integers in the range [5,9], and a third sub-range 130 including the six integers in the range [10, 15]. As used herein, the notation [j, k] refers to a set of consecutive integers, the first of which is j, and the last of which is k. In operation, a random number is generated, and the egress port associated with the sub-range into which the random number falls is selected. In some embodiments, all of the operations involved are integer operations, i.e., each of the random numbers R is an integer, each element of the range of possible values of the random numbers is an integer, and each element of each of the sub-ranges is an integer.

For example, if the integer quotient $\lfloor 2^r/m \rfloor$ (i.e., the floor of the real ratio of $2^r$ to m) is referred to as $K_m$, then the range [0, $R_{max}$] may be divided into m sub-ranges, or "buckets", each, except the last, containing the same number ($K_m$) of elements. The first sub-range is [0, $K_m-1$], the second sub-range is [$K_m$, $2*K_m-1$] and so on, with the last sub-range being [$(m-1)*K_m$, $R_{max}$]. The selection of a resource then involves selecting the resource with index I where R falls in the range [$I*K_m$, $(I+1)*K_m-1$].

In this approach, the number of elements in the last sub-range is greater, by an amount equal to $2^r$ modulo m (or "$2^r$ mod m", the remainder of the integer quotient $2^r/m$) than the number of elements in each of the other sub-ranges. This may result in a significant bias. For example, if m=3 and $R_{max}$=31, then $K_m$ is 10; the first two sub-ranges will contain 10 integers each, and the third sub-range will contain 12 (i.e., 10+$2^r$ modulo m). The resource associated with the third sub-range will therefore have a probability of being selected that is 2/32 greater than the probability of the respective resources associated with either of the other two sub-ranges being selected, and it may be expected that the load assigned to the resource associated with the third sub-range will exceed the load of the other two resources by 20% (12 being 20% greater than 10). In the example of FIG. 1, the bias is similar, with the resource associated with the third sub-range having a probability greater, by 1/16, than the probability of the respective resources associated with either of the other two sub-ranges being selected. In general, the bias may be equal to ($2^r$ modulo m)/$2^r$; in general, because the largest possible remainder for a divisor of m is (m−1), the largest possible bias for a given r and m is (m−1)/$2^r$. It is apparent from these expressions that in general the bias may be reduced by using a larger value of r.

The bias may also be reduced by ensuring that all of the sub-ranges have, as nearly as possible, the same size (i.e., the same number of elements), i.e., ensuring that the difference in size between any two sub-ranges is at most one. This may be accomplished, for example, by initially defining the sub-ranges as described above, and then, by adjusting the sub-range boundaries, increasing the number of elements in each of the ($2^r$ modulo m)−1 sub-ranges preceding the last sub-range by one, thereby reducing the number of elements in the last sub-range by ($2^r$ modulo m)−1. Another method for selecting sub-range boundaries may be to arrange for each of the sub-ranges except the last to have $2^r/m$ elements if $2^r$ modulo m is less than m/2, and to have $2^r/m+1$ elements if $2^r$ modulo m is greater than or equal to m/2 (with the last sub-range extending to $R_{max}$ in either case).

In another embodiment, the total range spanned by the sub-ranges is selected (when $2^r$ modulo m>0) to have a number of elements, N, that is the greatest number smaller than $2^r$ for which m divides N (i.e., for which N modulo m=0), so that the sub-ranges may be selected to be of exactly equal size (each sub-range including N/m integers). In operation, for each random number R, a resource is selected as follows: (i) if R>N−1, the resource associated with the (R−N+1)$^{th}$ sub-range is selected, and (ii) otherwise (i.e., if R<N), the resource associated with the sub-range into which R falls is selected. In the example above, in which r=5 and m=3, N (the greatest number smaller than 32 divisible by 3) is 30, so that the first sub-range is [0, 9], the second sub-range is [10, 19], and the third sub-range is [20, 29]. In this case, the first viable egress port is selected if the random number is either between 0 and 9 or equal to 30, the second viable egress port is selected if the random number is either between 10 and 19 or equal to 31, and the third viable egress port is selected if the random number is between 20 and 29. If the random number equals 30, then the first viable egress port is selected, and if the random number equals 31, then the second viable egress port is selected.

In a system in which the number of resources among which the load is to be balanced is bounded, and the maximum number of such resources is relatively small (e.g., less than 100), a pipelined synchronous digital hardware solution may be employed to perform resource selection at the full clock rate (i.e., making one selection per clock cycle). For example, a packet switch may have 12 egress ports, a subset of m of which may be viable for any particular destination address. In this case, a hardware design such as that described in Listing 1 may be employed for pipelined selection, at the full clock rate, of egress ports, as described in further detail below.

For example, for a switch with M egress ports, several tables may be generated prior to operation according to the number M of egress ports and the bit width r of the random numbers. A first table, referred to as the max divisible table (MDT) includes one entry for each value of m in the range [1, M], with MDT[m−1]=$2^r$−($2^r$ mod m)−1. This value is the largest element in the total range when the number of elements in the total range is selected, as described above, to be the greatest number divisible by m and smaller than $2^r$. For example, if M=4 and r=5, then the table contains the following entries:

case $m$=1:MDT[1−1]=$2^5$−($2^5$ mod 1)−1=32−0−1=31 case $m$=2:MDT[2−1]=$2^5$−($2^5$ mod 2)−1=32−0−1=31 case $m$=3:MDT[3−1]=$2^5$−($2^5$ mod 3)−1=32−2−1=29 case $m$=4:MDT[4−1]=$2^5$−($2^5$ mod 4)−1=32−0−1=31

The values M=4 and r=5 are used in this example for illustration, and in some embodiments M and r have different respective values. For example, r may be significantly greater, e.g., r may be equal to 32.

A second table, referred to as a water mark table (WMT), includes one entry for each value of m in the range [1, M], the value of each entry being the upper limit of the first sub-range. These values may be calculated as: WMT[m−1]=((MDT[m−1]+1)/m)−1. For example, if M=4 and r=5 then the table contains the following entries:

case $m$=1:WMT[1−1]=(31+1)/1−1=32−1=31 case $m$=2:WMT[2−1]=(31+1)/2−1=16−1=15 case $m$=3:WMT[3−1]=(29+1)/3−1=10−1=9 case $m$=4:WMT[4−1]=(31+1)/4−1=8−1=7

A third table, referred to as the water delta table (WDT) includes one entry for each value of m in the range [1, M], the value of each entry being one greater than the corresponding entry in the water mark table, i.e., WDT[m−1]=WMT[m−1]+1.

The selection of an egress port then proceeds as follows, in some embodiments of a port selection circuit such as that illustrated in FIG. 3 and described in Listing 1. It will be understood that an analogous circuit may be employed when the resources from among which a selection is to be made are not ports but other resources. The port selection circuit implements the sequence of steps illustrated in the flowchart of FIG. 2; in other embodiments these steps may instead be executed, for example, by a general purpose processor (e.g., a central processing unit or a graphics processing unit), executing instructions stored in a non-transitory medium.

In operation, a bit vector, containing one bit for each egress port, the value of the bit being 1 if the egress port is a viable port for routing the present packet and 0 otherwise, is received by the port selection circuit, along with a random number, and along with two of the three tables described above, the max divisible table, and the water mark table. The port selection circuit may either receive the water delta table or calculate its values from the water mark table. In some embodiments the number used to select the resource is a random number, and, for convenience, portions of the present disclosure assume that a random number is used. The number need not be random, however, and the term "indexing number" is used herein to refer to a number (whether random or not) used to select a resource as described herein. Accordingly, it will be understood that in embodiments described herein, the use of an indexing number (which may or may not be random) may be substituted for the use of a random number.

Figure 2:
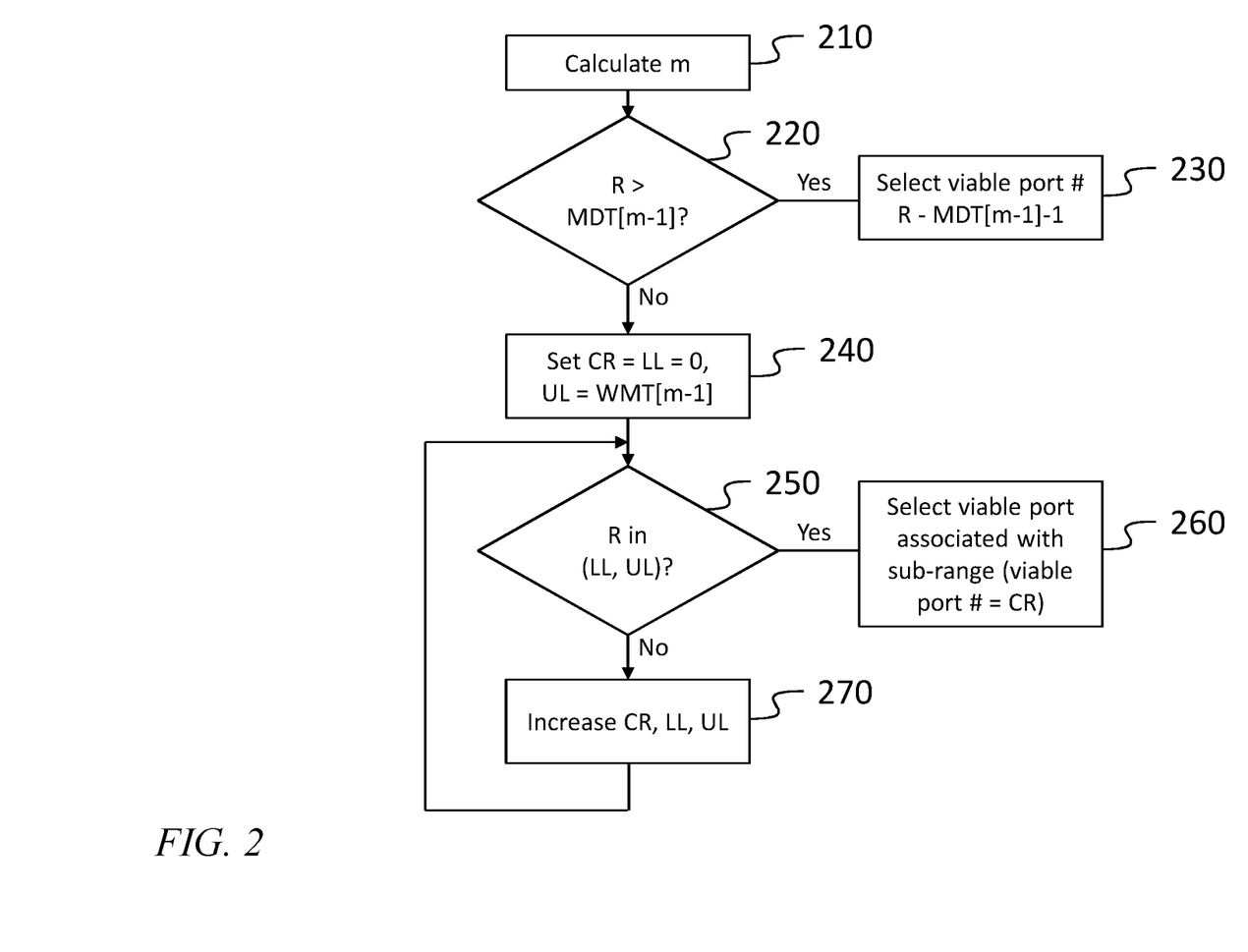
FIG. 2 is a flow chart of a method for selecting a resource, according to an embodiment of the present invention.

Referring to FIG. 2, in a step 210, the number of bits of the bit vector having a value of 1 is summed, in a bit summation circuit 310 (FIG. 3) (implemented in lines 31-34 of Listing 1), to form the value m (the number of viable ports). In a step 220, the port selection circuit tests whether the random number exceeds the upper limit of the total range (stored in the final value of the max divisible table (MDT)); if it does, then, in a step 230, the $I^{th}$ port of the m viable ports is selected, where I is the amount by which the random number exceeds the upper limit of the total range. If the viable ports are numbered beginning at 0 (i.e., the first viable port being viable port number 0), then the port number of the selected viable port is (R−MDT[m−1]−1). In FIG. 3, this step is performed by a pre-selection circuit 320, implemented in line 49 of Listing 1. The pre-selection circuit 320 generates an output value equal to the number of the selected viable port if a port has been selected, and otherwise generates a reserved value (e.g., −1) indicating that a port has not been selected.

In a step 240, a current range (CR) number (i.e., the number of the viable port associated with the current range) is set to 0, the lower limit (LL) of the range is set to 0, and the upper limit (UL) is set to the value (WMT[m−1]) of the water mark table corresponding to m. In FIG. 3, this step corresponds to the setting of the LL and UL inputs of the first sub-range test circuit 330-1 (labeled Pipe stage #0), of a plurality of sub-range test circuits arranged in a pipeline. In Listing 1, this step corresponds to the setting of the value of the signal water_mark[0], which corresponds to the initial value of the upper limit, according to the current value of m (represented, in Listing 1, by the symbol num_hot_bits), in lines 58-107 of Listing 1. In the implementation of Listing 1, an explicit test is not performed against the lower limit, because if the random number is less than the lower limit corresponding to any given sub-range, a port will have been selected in a previous sub-range test circuit. In other embodiments a plurality of sub-range test circuits may be otherwise arranged, e.g., in parallel, with an output-combining circuit being used to combine the outputs of the sub-range test circuits to determine which resource has been selected. The req signal (of e.g., lines 118, 125, and 135) may serve two purposes: (i) the req output from the last stage of the pipeline indicates when the result is ready and (ii) in some embodiments, the req signal may be used to reduce power of a pipeline stage, e.g. when there is no active operation after a pipeline stage has forwarded its computed result to the next stage and no new data is present (the latter feature is not implemented in the code of Listing 1).

In a step 250 the port selection circuit tests whether R is in the range (lower limit, upper limit); if so, it returns, in a step 260, the viable port number (i.e., the current range number) as the selected port; otherwise the port selection circuit proceeds to step 270, in which the current range number is incremented by one, and the lower limit and upper limit are both increased (by WDT[m−1]), to the values corresponding to the next range to be tested. The circuit then repeats steps 250 and 270 until the sub-range including the random number is found. In FIG. 3, this set of steps is accomplished by the pipeline of sub-range test circuits 330-1, 330-2, . . . , 330-M, which may be referred to collectively as sub-range test circuits 330. The circuit of each of the sub-range test circuits 330 is defined in lines 151-203 of Listing 1, and the pipeline (consisting of 12 sub-range test circuits 330 in the embodiment of Listing 1, in which M=12) is implemented in lines 111-133 of Listing 1.

Each of the sub-range test circuits 330 has a selected port input (sel_port in Listing 1) (which may, in the more general case, be referred to as a "selected resource input"). This signal is initially set to a reserved value, e.g., −1 (which may be represented as hexadecimal F (or 4'hF in Verilog, on line 52 of Listing 1), the 4-bit two's complement representation of −1) to indicate that no port has yet been selected. When any one of the sub-range test circuits 330 determines that (i) a port has not yet been selected (line 187 of Listing 1) and (ii) the random number falls within its range (line 194 of Listing 1) it sets its port select output to the number of the sub-range test circuit 330 in the pipeline (line 195 of Listing 1). Because the selected port input of each of the sub-range test circuits 330 (except the first sub-range test circuit 330-1) is connected to the selected port output (which may also be referred to as a "selected resource output") of the preceding one of the sub-range test circuits 330 (and because the selected port input of the first sub-range test circuit 330-1 is connected to the output of the pre-selection circuit 320), each of the sub-range test circuits 330 will test the random number against its respective range only if a port has not yet been selected. Once a port is selected by one of the sub-range test circuits 330 (or by the pre-selection circuit 320), the selected port number propagates unchanged through the remainder of the sub-range test circuits 330 to the output 340.

Figure 3:
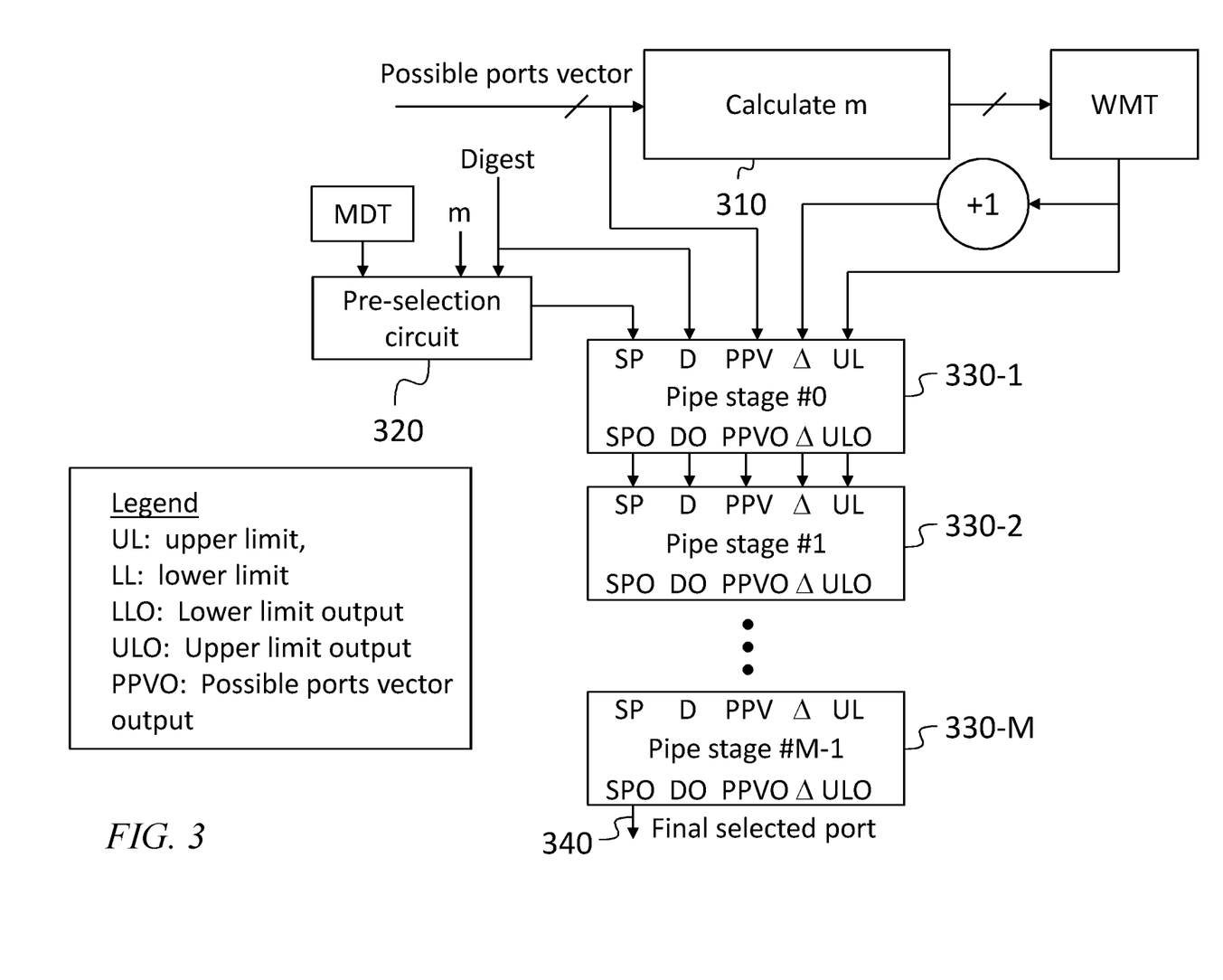
FIG. 3 is a block diagram of a digital circuit for selecting a resource, according to an embodiment of the present invention.

The upper limit is received by each of the range comparison circuits 330 at the upper level input (UL in FIG. 3). For the first range comparison circuit 330-1 this upper limit is received from the water mark table; for other range comparison circuits 330 it is received from the upper limit output (ULO in FIG. 3) of the preceding one of the range comparison circuits 330, which calculates the value (in line 198 of Listing 1) as the sum of the upper limit input and the water delta input ($\Delta$ in FIG. 3; calculated in lines 58-107 of Listing 1). The embodiments of FIG. 3 and Listing 1 are capable of operating with relatively large indexing numbers (the embodiment of Listing 1, for example, using a 32-bit random number or "digest" as the indexing number), and the number of pipeline stages used is equal to m (and independent of the size of the random numbers being used). A pipeline with M stages (as illustrated in FIG. 3 and implemented in Listing 1 (with M=12) is therefore sufficient for an application in which m may vary but does not exceed M.

Figure 4:
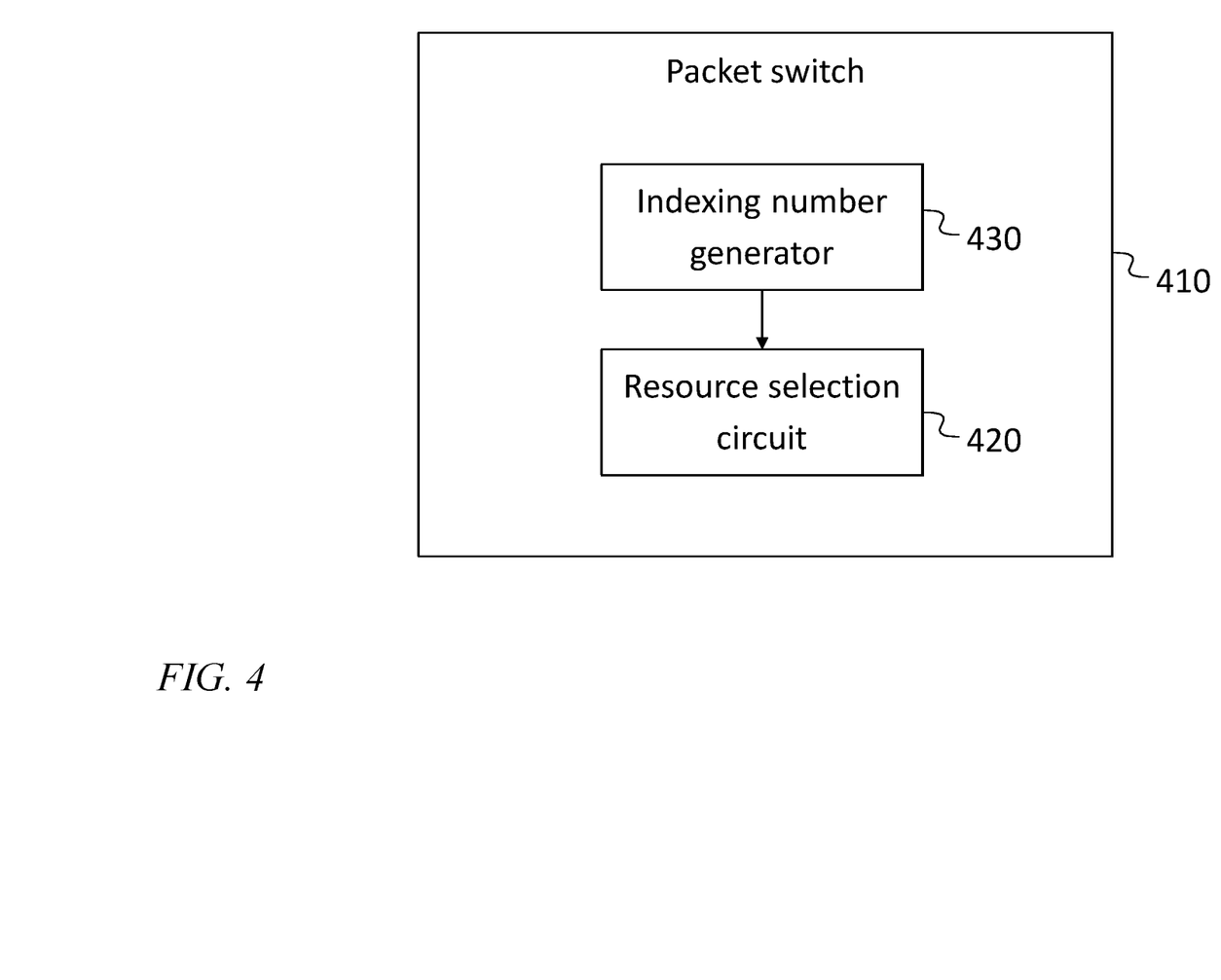
FIG. 4 is a block diagram of a packet switch, according to an embodiment of the present invention.

Referring to FIG. 4, a packet switch 410 may include a resource selection circuit 420 constructed, for example, according to the embodiment of FIG. 3. The indexing number received by the resource selection circuit 420 may be generated by an indexing number generator 430, which may generate random numbers, for example, using a linear feedback shift register. In other embodiments, a digest of routing-related numbers (or "flow information") may be used as the indexing number. This approach may result in the same egress port being selected for any two packets having identical flow information, and may reduce the risk of out-of-order delivery of any pair of packets traveling from the same source to the same destination. The digest may be calculated for IPv4 and IPv6 as follows.

The IPv4 flow digest algorithm takes a 26-byte flow tuple as input and produces a 32-bit flow digest as output. The IPv4 flow digest may be calculated according to the following equations:

$$\text{digest}[0:7]=\text{dmac}[0:7]\char`\^\ldots\char`\^\text{dmac}[40:47]\char`\^\text{smac}[0:7]\char`\^\ldots\char`\^\text{smac}[40:47]$$

$$\text{digest}[8:15]=\text{dip}[0:7]\char`\^\ldots\char`\^\text{dip}[24:31]\char`\^\text{sip}[0:7]\char`\^\ldots\char`\^\text{sip}[24:31]$$

$$\text{digest}[16:23]=\text{etype}[0:7]\char`\^\text{etype}[8:15]$$

$$\text{digest}[24:31]=\text{dport}[0:7]\char`\^\text{dport}[8:15]\char`\^\text{sport}[0:7]\char`\^\text{sport}[8:15]$$

where the ^ symbol denotes exclusive OR, dmac is the destination media access control (MAC) address (from within the Ethernet header field), smac is the source MAC address (from within the Ethernet header field), etype is the Ethernet type (from within the Ethernet header field), dip is the destination IP address (from within the IP packet header field), sip is the source IP address (from within the IP packet header field), and dport and sport are the destination and source port (from within the TCP or UDP packet header), respectively.

The IPv6 flow digest algorithm takes a 50-byte flow tuple as input and produces a 32-bit flow digest as output. The IPv6 flow digest may be calculated according to the following equations:

$$\text{digest}[0:7]=\text{dmac}[0:7]\char`\^\ldots\char`\^\text{dmac}[40:47]\char`\^\text{smac}[0:7]\char`\^\ldots\char`\^\text{smac}[40:47]$$

$$\text{digest}[8:15]=\text{dip}[0:7]\char`\^\ldots\char`\^\text{dip}[120:127]\char`\^\text{sip}[0:7]\char`\^\ldots\char`\^\text{sip}[120:127]$$

$$\text{digest}[16:23]=\text{etype}[0:7]\char`\^\text{etype}[8:15]$$

$$\text{digest}[24:31]=\text{dport}[0:7]\char`\^\text{dport}[8:15]\char`\^\text{sport}[0:7]\char`\^\text{sport}[8:15].$$

The digest received by the port selection circuit of Listing 1 may be an IPv4 or IPv6 digest as defined above, or a hash of an IPv4 digest or of an IPv6 digest. If an un-hashed digest is used, it may be masked (line 55 of Listing 1) so that the selection of the egress port is affected only by those parts of the digest that survive the mask.

The use of a digest as the indexing number may result in the loss of some of the load-balancing benefits that may be achieved by using a random number as the indexing number. In some embodiments, the digest is used as the input to a hash function, and the output of the hash function (i.e., the hashed digest) is used as the indexing number. The use of a hash function (not present in the embodiment of Listing 1) may improve load balancing while preserving the property that the same egress port is selected for any two packets having identical flow information.

Listing 1

```
1   //-----------------------------------------------------------
2   //           (C) Rockley Photonics
3   // Module   : bin_search_top
4   // Author   : Bhaskar Chowdhuri (bhaskar.chowdhuri@rockleyphotonics.com)
5   // Description : Sub-range selection code-snippet
6   //-----------------------------------------------------------
7   module subrange_selector(
8            input logic         clk,
9            input logic         rst_n,
10
11           input logic [31:0]  water_mark_table[15:0],
12           input logic [31:0]  max_divisible_table[15:0],
13           input logic [31:0]  pkt_digest,
14           input logic [31:0]  digest_mask,
15           input logic [11:0]  possible_ports,
16           input logic         search_req,
17
18           output logic        result_ready,
19           output logic        no_valid_port_found,
20           output logic [3:0]  final_port_num
21           );
22
23  logic [ 3:0]  num_hot_bits.
24  logic [31:0]  digest[12:0];
25  logic [31:0]  water_mark[12:0];
26  logic [31:0]  water_delta[12:0];
27  logic [ 3:0]  sel_port[12:0];
28  logic [ 5:0]  req[12:0];
29  logic [11:0]  pp_in[12:0];
30
    assign                         num_hot_bits[3:0]                =
31  possible_ports[0]+possible_ports[1]+possible_ports[2]
32           +possible_ports[3]+possible_ports[4]+possible_ports[5]
33           + possible_ports[6]+possible_ports[7]+possible_ports[8]
34           +possible_ports[9]+possible_ports[10]+possible_ports[11];
35  // Hash pipe line
36  always_ff @(posedge clk or negedge rst_n)
37  begin
38    if (!rst_n)
39  begin
40       water_mark[0] <= 32'h0;
41       water_delta[0] <= 32'h0;
42       pp_in[0 ] <= 12'h0;
43       sel_port[0 ] <= 4'hF;
44       req[0] <= 1'b0;
```

-continued

Listing 1

```
45        digest[0] <= 32'h0;
46      end
47    else
48    begin
49      if ((pkt_digest & digest_mask) > max_divisible_table[num_hot_bits])
          sel_port[0]      <=    (pkt_digest    &    digest_mask)-
50 max_divisible_table[num_hot_bits] -1;
51      else
52        sel_port[0] <= 4'hF;
53      pp_in[0] <= possible_ports;
54      req[0] <= search_req;
55      digest[0] <= pkt_digest & digest_mask;
56
57
58      unique case (1'b1)
59        num_hot_bits == 0: begin
60          water_mark[0] <= water_mark_table[0];
61          water_delta[0]<= water_mark_table[0] + 1;
62          end
63        num_hot_bits == 1: begin
64          water_mark[0] <= water_mark_table[1];
65          water_delta[0]<= water_mark_table[1] + 1;
66          end
67        num_hot_bits == 2: begin
68          water_mark[0] <= water_mark_table[2];
69          water_delta[0]<= water_mark_table[2] + 1;
70          end
71        num_hot_bits == 3: begin
72          water_mark[0] <= water_mark_table[3];
73          water_delta[0]<= water_mark_table[3] + 1;
74          end
75        num_hot_bits == 4: begin
76          water_mark[0] <= water_mark_table[4];
77          water_delta[0]<= water_mark_table[4] + 1;
78          end
79        num_hot_bits == 5: begin
80          water_mark[0] <= water_mark_table[5];
81          water_delta[0]<= water_mark_table[5] + 1;
82          end
83        num_hot_bits == 6: begin
84          water_mark[0] <= water_mark_table[6];
85          water_delta[0]<= water_mark_table[6] + 1;
86          end
87        num_hot_bits == 7: begin
88          water_mark[0] <= water_mark_table[7];
89          water_delta[0]<= water_mark_table[7] + 1;
90          end
91        num_hot_bits == 8: begin
92          water_mark[0] <= water_mark_table[8];
93          water_delta[0]<= water_mark_table[8] + 1;
94          end
95        num_hot_bits == 9: begin
96          water_mark[0] <= water_mark_table[9];
97          water_delta[0]<= water_mark_table[9] + 1;
98          end
99        num_hot_bits ==10: begin
100         water_mark[0] <= water_mark_table[10];
101         water_delta[0]<= water_mark_table[10] + 1;
102         end
103       num_hot_bits ==11: begin
104         water_mark[0] <= water_mark_table[11];
105         water_delta[0]<= water_mark_table[11] + 1;
106         end
107     endcase
108   end
109 end
110
111 // Instan pipe stages
112 generate
113   for(genvar i=0;i<12;i==)
114   begin:instan_hash_pipe
115     rp_re_hash_pipe #(.STAGE_NUM(i)) hash_pipe(
116       .clk    (clk),
117       .rst_n  (rst_n),
118       .in_req  (req[i]),
119       .in_ppb  (pp_in[i]),
120       .in_water_mark (water_mark[i]),
```

Listing 1

```
121              .in_water_delta (water_delta[i]),
122              .in_digest      (digest[i]),
123              .in_sel_port    (sel_port[i]),
124
125              .out_req        (req[i+1]),
126              .out_ppb        (pp_in[i+1]),
127              .out_water_mark (water_mark[i+1]),
128              .out_water_delta (water_delta[i+1]),
129              .out_digest     (digest[i+1]),
130              .out_sel_port   (sel_port[i+1])
131            );
132     end
133  endgenerate
134
135  assign result_ready    = req[12];
136  assign final_port_num  = pp_in[12];
137  assign no_valid_port_found = (sel_port[12]==12'h0;
138
139  endmodule
140
141
142
143
144
145
146
147
148
149
150
151  module rp_re_hash_pipe #(STAGE_NUM=0) (
152         input logic         clk,
153         input logic         rst_n,
154
155         input logic [ 5:0]   in_req,
156         input logic [11:0]   in_ppb,
157         input logic [31:0]   in_water_mark,
158         input logic [31:0]   n_water_delta,
159         input logic [31:0]   in_digest,
160         input logic [ 3:0]   in_sel_port,
161
162         output logic [ 5:0]  out_req,
163         output logic [11:0]  out_ppb,
164         output logic [31:0]  out_water_mark,
165         output logic [31:0]  out_water_delta,
166         output logic [31:0]  out_digest,
167         output logic [ 3:0]  out_sel_port
168       );
169
170  always_ff @(posedge clk or negedge rst_n)
171  begin
172     if (!rst_n)
173     begin
174       out_water_mark <= 32'h0;
175       out_water_delta <= 32'h0;
176       out_digest     <= 32'h0;
177       out_ppb        <= 12'h0;
178       out_sel_port   <= 4'h0;
179       out_req        <= 6'h0;
180     end
181     else
182     begin
183       out_water_delta <= in_water_delta;
184       out_digest     <= in_digest;
185       out_ppb        <= in_ppb;
186       out_req        <= in_req;
187       if ((in_sel_port!=4'hF) || (in_ppb[STAGE_NUM]==0))
188       begin
189         out_water_mark <= in_water_mark;
190         out_sel_port   <= in_sel_port;
191       end
192       else
193       begin
194         if (in_digest <= in_water_mark)
195           out_sel_port <= STAGE_NUM;
```

-continued

Listing 1

```
196         else
197             out_sel_port <= in_sel_port;
198             out_water_mark <= in_water_mark + in_water_delta;
199         end
200     end
201 end
202
203 endmodule
```

Although exemplary embodiments of a system and method for load balancing have been specifically described and illustrated herein, many modifications and variations will be apparent to those skilled in the art. Accordingly, it is to be understood that a system and method for load balancing constructed according to principles of this invention may be embodied other than as specifically described herein. The invention is also defined in the following claims, and equivalents thereof.

What is claimed is:

1. A resource selection circuit for selecting one of a plurality of resources, each of the resources being identified by a resource number and associated with a respective sub-range of numbers, the circuit comprising:
   a first sub-range test circuit having an indexing number input for receiving an indexing number; and
   a second sub-range test circuit having an indexing number input for receiving the indexing number,
   the first sub-range test circuit being configured to:
      determine whether the indexing number is within a first sub-range of numbers; and
      output a first resource number when the indexing number is within the first sub-range of numbers, the first resource number identifying a resource associated with the first sub-range of numbers,
   the second sub-range test circuit being configured to:
      determine whether the indexing number is within a second sub-range of numbers; and
      output a second resource number when the indexing number is within the second sub-range of numbers, the second resource number identifying a resource associated with the second sub-range of numbers, and
   the first sub-range of numbers and the second sub-range of numbers being contiguous and non-overlapping,
   wherein the first sub-range test circuit has:
      an indexing number output connected to an indexing number input of the second sub-range test circuit; and
      a selected resource output connected to a selected resource input of the second sub-range test circuit, and
   the first sub-range test circuit is configured to send:
      to the indexing number input of the second sub-range test circuit, the indexing number; and
      to the selected resource input of the second sub-range test circuit:
         the first resource number, when the indexing number is within the first sub-range of numbers; and
         a reserved value indicating that a resource has not been selected, otherwise.

2. The resource selection circuit of claim 1, wherein the first sub-range of numbers has the same size as the second sub-range of numbers.

3. The resource selection circuit of claim 1, further comprising a random number generating circuit having an output connected to:
   the indexing number input of the first sub-range test circuit; and
   the indexing number input of the second sub-range test circuit.

4. The resource selection circuit of claim 3, wherein the random number generating circuit is configured to receive a first number and a second number and generate a random number comprising the bit-wise exclusive OR of the first number and the second number.

5. The resource selection circuit of claim 1, wherein:
   the first sub-range test circuit and the second sub-range test circuit are constructed as synchronous logic having a common clock, and
   the second sub-range test circuit is configured to determine, one clock cycle after the first sub-range test circuit has determined whether the indexing number is within the first sub-range of numbers, whether the indexing number is within the second sub-range of numbers.

6. The resource selection circuit of claim 1, wherein
   the first sub-range test circuit has an upper limit input, and
   the first sub-range of numbers extends from zero to a number received at the upper limit input of the first sub-range test circuit.

7. The resource selection circuit of claim 6, wherein:
   the first sub-range test circuit further has a delta input and an upper limit output;
   the second sub-range test circuit further has an upper limit input connected to the upper limit output of the first sub-range test circuit; and
   the first sub-range test circuit is configured to form the sum of a number received at the upper limit input of the first sub-range test circuit and a number received at the delta input of the first sub-range test circuit, and transmit the sum through the upper limit output of the first sub-range test circuit.

8. The resource selection circuit of claim 7, wherein the second sub-range test circuit is configured to determine whether the indexing number is within the second sub-range of numbers by:
   determining that the indexing number is within the second sub-range of numbers if:
      the selected resource input of the second sub-range test circuit has a value equal to the reserved value; and
      the indexing number is less than or equal to a number received at the upper limit input of the second sub-range test circuit; and
   determining that the indexing number is not within the second sub-range of numbers, otherwise.

9. The resource selection circuit of claim 1, further comprising a pre-selection circuit having an indexing number input for receiving the indexing number, the pre-selection circuit being connected to the first sub-range test circuit and being configured to send, to a selected resource input of the first sub-range test circuit:
- a number identifying a selected resource when the indexing number is not within a total range, the total range being the union of a plurality of sub-ranges of numbers, each of the sub-ranges of numbers being associated with a respective sub-range test circuit of a plurality of sub-range test circuits including the first sub-range test circuit and the second sub-range test circuit; and
- the reserved value, otherwise.

10. The resource selection circuit of claim 9, wherein the pre-selection circuit is configured to calculate the number identifying the selected resource by subtracting a largest number in the total range from the indexing number.

11. A packet switch having an ingress port and a plurality of egress ports, and comprising the resource selection circuit of claim 1, the packet switch being configured to employ the resource selection circuit, upon receipt of a packet at the ingress port, to select an egress port from among a plurality of egress ports suitable for routing the packet to a destination identified in the packet.

12. The packet switch of claim 11, wherein the resource selection circuit is configured to receive flow information and generate the indexing number based on the flow information.

13. A method for selecting from among a plurality of resources, the method comprising:
- associating each of the resources with a respective sub-range of consecutive integers of a plurality of sub-ranges of consecutive integers, the sub-ranges of consecutive integers being non-overlapping and together including all of the integers of a total range of consecutive integers;
- generating a first indexing number within the total range of consecutive integers;
- selecting the resource associated with the sub-range of consecutive integers including the first indexing number; and
- executing a task using the selected resource, wherein the generating of the first indexing number consists of generating a first random number, and wherein:
- each of the resources is identified by one of a set of consecutive integers beginning with the integer 1; and
- the method further comprises:
    - generating a second random number greater than the largest integer in the total range of consecutive integers, and
    - selecting the resource associated with the integer equal to the difference between second random number and the largest integer in the total range of consecutive integers.

* * * * *